United States Patent [19]

Maruyama et al.

[11] 4,378,389

[45] Mar. 29, 1983

[54] SILICONE RELEASE COATING AND LUBRICATING COMPOSITIONS AND METHODS

[75] Inventors: Kazo Maruyama; Shuhei Kosaka; Akitsugu Kurita, all of Ohta, Japan

[73] Assignee: Toshiba Silicones Ltd., Tokyo, Japan

[21] Appl. No.: 238,237

[22] Filed: Feb. 25, 1981

[30] Foreign Application Priority Data

Feb. 26, 1980 [JP] Japan .................................. 55-23155
Feb. 26, 1980 [JP] Japan .................................. 55-23156

[51] Int. Cl.$^3$ .............................................. B05D 3/02
[52] U.S. Cl. ...................................... 427/387; 252/11; 252/49.6; 427/386; 428/447; 428/450; 428/452; 525/477

[58] Field of Search ................ 427/386, 387; 525/477; 528/33, 34, 21, 22; 252/11, 49.6; 184/1 E, 5, 6; 556/413, 425; 428/447, 446, 450, 452

[56] References Cited

U.S. PATENT DOCUMENTS

| | | | |
|---|---|---|---|
| 3,247,280 | 4/1966 | Kanner | 556/413 X |
| 3,385,727 | 5/1968 | Thomas et al. | 525/477 X |
| 3,436,251 | 4/1969 | Rees et al. | 525/478 X |
| 3,849,359 | 11/1974 | Nitzsche et al. | 525/477 |
| 4,252,933 | 2/1981 | Sumida et al. | 528/33 |

*Primary Examiner*—Norman Morgenstern
*Assistant Examiner*—Thurman K. Page

[57] ABSTRACT

A silicone base release or lubricating agent is disclosed which is comprised of the reaction product of a silanol-containing polydiorganosiloxane fluid with a first reaction product of epoxy or glycidoxy functional silanes and aminofunctional silanes.

7 Claims, No Drawings

SILICONE RELEASE COATING AND LUBRICATING COMPOSITIONS AND METHODS

This patent application claims priority over Japanese patent applications Nos. 23155/80 and 23156/80, each filed Feb. 26, 1980, by the present inventors and which are hereby incorporated by reference.

FIELD OF THE INVENTION

The present invention relates to a method of imparting release properties and lubricating properties to surfaces of materials such as metals, plastics, papers and woods by utilizing silicone based release coating and lubricating compositions.

BACKGROUND OF THE INVENTION

A conventional method for imparting release or lubricating properties to a surface of an article is the treatment of the surface with a coating of an animal, vegetable, or mineral oil, fat or a metal soap. These are utilized to impart release or lubricating properties to the surfaces of non-smooth articles, such as, for example, a sill for a sliding door or other furniture, or for a fastener. It is especially preferable to be able to impart release or lubricating properties by forming surface films at room temperature or with only slight heating. Additionally, there has recently been adopted a method in which the surface is coated with a silicone fluid. However, according to these known methods, coating should be conducted every time it is required to impart the release and lubricating property. Furthermore, these coating oils absorb dust and dirt and become readily contaminated. Additionally these methods are defective since the release and lubricating agents migrate to any material coming in contact with the coated surface. This causes the additional problem of repelling paint or ink should it become necessary to coat or print the material contaminated with the migrated release or lubricating agent. If a silicone fluid having a long-chain alkyl group on the side chain is used instead of an ordinary silicone fluid, a paint can be smoothly coated on a molded article by first washing the surface with acetone or the like. But without such treatment these release or lubricating agents are also left adhering to the molded article, as in the above-described case utilizing ordinary silicone fluid. As means for eliminating this disadvantage, there has been developed a method in which a cured film of a silicone resin or fluoro carbon resin is formed on the surface by baking. However, this method is also disadvantageous since a high temperature exceeding 200° C. is required for the formation of such a coating film. Additionally, this method can only be utilized with substrates having a high heat resistance, such as metals or porcelains. There has also been proposed a method of forming a cured film at room temperature utilizing a so-called room temperature curable silicone elastomer composition. The composition is diluted with an organic solvent, and the surface is coated with the solution. However, this method is also defective since in order to complete curing, the coated surface should be allowed to stand for more than 24 hours.

The present inventors have developed a method capable of imparting a release or lubricating property without any of the foregoing defects and disadvantages. It has been found that a suitable composition may be obtained by reacting a polyorganosiloxane having a silanol group with a first reaction product of an amino group-containing silane and an epoxy group-containing silane. A film is formed in a short time by evaporating a solvent at room temperature or by slight heating and the formed film has excellent adhesion to the substrate. Additionally, the coating does not migrate onto any material coming in contact with the formed film.

It is therefore an object of the present invention to provide silicone based release and lubricating agents.

It is another object of the present invention to provide silicone compositions comprised of the reaction products of polydiorganosiloxanes and another reaction product of a combination of epoxy or glycidoxyfunctional silanes and amino-functional silanes.

It is another object of the present invention to provide a method for lubricating the surfaces of articles by forming a film in a short time at room temperature or by slight heating regardless of the configuration or composition of the article.

It is another object of the present invention to provide methods of manufacture and use of such silicone release and lubricating agents.

These and other objects will become apparent to those skilled in the art upon consideration of the following specification and Claims.

SUMMARY OF THE INVENTION

A silicone based composition for imparting release and lubricating properties to a surface of a substrate, comprises a reaction product of (1) 80 to 99.9% by weight of a polydiorganosiloxane having a viscosity of 20 to 1,000,000 centistokes as measured at 25° C. and containing therein at least one silanol group per molecule with (2) 0.1 to 20% by weight of a reaction product of (A) an amino group-containing silane represented by the following general formula:

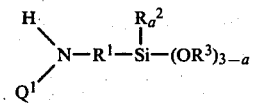

wherein $Q^1$ represents a monovalent group selected from the group consisting of hydrogen atom, $-CH_3$, $-CH_2CH_2NH_2$ and $-CH_2CH_2NHCH_2CH_2NH_2$, $R^1$ represents a divalent hydrocarbon group having 1 to 4 carbon atoms, $R^2$ and $R^3$ stand for a monovalent hydrocarbon group having 1 to 4 carbon atoms, and a is 0 or 1, with (B) an epoxy group-containing silane represented by the following general formula:

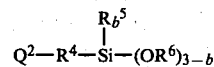

wherein $Q^2$ represents an epoxy group-containing group selected from the group consisting of glycidoxyl and epoxycyclohexyl groups, $R^4$ represents a divalent hydrocarbon group having 2 to 4 carbon atoms, $R^5$ and $R^6$ stand for a monovalent hydrocarbon group having 1 to 4 carbon atoms, and b is 0 or 1.

Thus the composition of the present invention may be thought of as a reaction product of components (1) and (2) wherein component (2) is itself a reaction product of components (A) and (B).

The silicone based release and lubricating agent described above may be then applied to a substrate in a coating step, followed by curing thereon.

DESCRIPTION OF THE INVENTION

More specifically, in accordance with the present invention, there is provided a method of and a composition for imparting a release or lubricating property to a surface of a substrate, which comprises coating on the surface of the substrate a composition comprising as a main component a reaction product of (1) 80 to 99.9% by weight of a polydiorganosiloxane having a viscosity of 20 to 1,000,000 centistokes as measured at 25° C. and containing therein at least one silanol group per molecule with (2) 0.1 to 20% by weight of a reaction product of (A) an amino group-containing silane represented by the following general formula:

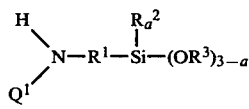

wherein $Q^1$ represents a monovalent group selected from the group consisting of hydrogen atom, $-CH_3$, $-CH_2CH_2NH_2$ and $-CH_2CH_2NHCH_2CH_2NH_2$, $R^1$ represents a divalent hydrocarbon group having 1 to 4 carbon atoms, $R^2$ and $R^3$ stand for a monovalent hydrocarbon group having 1 to B 4 carbon atoms, and a is 0 or 1, with (B) an epoxy group-containing silane represented by the following general formula:

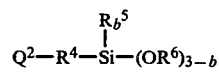

wherein $Q^2$ represents an epoxy group-containing group selected from the group consisting of glycidoxyl and epoxycyclohexyl groups, $R^4$ represents a divalent hydrocarbon group having 2 to 4 carbon atoms, $R^5$ and $R^6$ stand for a monovalent hydrocarbon group having 1 to 4 carbon atoms, and b is 0 or 1.

The composition is then allowed to form a coating film on the surface of the substrate or article to be coated.

Component (1) of the release or lubricating agent of the present invention is a polydiorganosiloxane having at least one silanol group per molecule, and it has a viscosity of 20 to 1,000,000 centistokes, preferably 100 to 100,000 centistokes, as measured at 25° C. If the viscosity is too low, the film becomes brittle, and if the viscosity is too high, handling of the composition before curing is difficult and troublesome. Among the organic group bonded to the silicon atom, there may be included alkyl groups such as methyl, ethyl and propyl groups, and phenyl and vinyl groups. The methyl group is preferred from the viewpoint of ease of synthesis of the polydiorganosiloxane. Among the silanol group-containing polydiorganosiloxanes, there may be included a polydimethyl siloxane having one end blocked by a silanol group and the other end blocked by a trimethylsilyl group, also a polydimethylsiloxane having both ends blocked by a silanol group, and a polymethylphenyl siloxane having both ends blocked by a silanol group. In order to greatly improve the lubricating properties of the compositions of the present invention it is preferred that 10 to 80% by weight of component (1) described above be a polydiorganosiloxane having one end chainstopped by a silanol group.

Among the amino group-containing silanes (2)-(A), there may be included, for example:
gamma-aminopropyltriethoxysilane,
gamma-aminopropylmethyldiethoxysilane,
N-(beta-aminoethyl)-aminomethyltrimethoxysilane,
gamma-[N-(beta-aminoethyl)amino]-propyltrimethoxysilane,
gamma-[N-(beta-aminoethyl)amino]-propylmethyldimethoxysilane,
N-(beta-aminoethyl)aminomethyltributoxysilane and
gamma-N-[beta-(N-(beta-aminoethyl)amino)ethyl]-aminopropyltrimethyloxysilane.

Among the epoxy group-containing silanes (2)-(B), there may be included, for example:
gamma-glycidoxypropyltrimethoxysilane,
gamma-glycidoxypropylmethyldimethoxysilane,
beta-(3,4-epoxycyclohexyl) ethyltrimethoxysilane,
beta-(3,4-epoxycyclohexyl)ethylmethyldimethoxysilane,
beta-(3,4-epoxycyclohexyl)ethyltriethoxysilane and
beta-(3,4-epoxycyclohexyl)-ethylmethyldiethoxysilane.

Component (2) is obtained by reacting the silanes (A) and (B) by heating and stirring. Incorporation of minor amounts of the unreacted silanes in the reaction product (2) is permissible.

It is preferred that the reaction ratio be such that 1 mole of the amino group-containing silane (A) is reacted with 0.5 to 3.0 moles and especially 0.75 to 1.5 moles, of the epoxy group-containing silane (B). If the proportion of the amino group-containing silane is too large, the storage stability of the release or lubricating agent is reduced, and if the proportion of the amino group-containing silane is too small, the adhesion of the film to the substrate is reduced.

The release or lubricating agent is obtained by reacting components (1) and (2) with heating and by using a solvent, if necessary. The amounts of the components (1) and (2) to the total of (1) and (2) are such that the amount of the component (1) is 80 to 99.9% by weight, and preferably 90 to 99% by weight, and the amount of component (2) is 0.1 to 20% by weight, and preferably 1 to 10% by weight. If the amount of the component (2) is too large, the stability of the release or lubricating agent is reduced, and if the amount of the component (2) is too small, the adhesion of the film is reduced.

The above reaction is a condensation reaction between ≡SiOH in component (1) and ≡SiOR in component (2). If the amount of ≡SiOR is excessive compared to the amount of ≡SiOH in this reaction, condensation is further advanced at the film-forming step and a strong film in which curing is much advanced is obtained.

The thus formed release composition is diluted with an inert solvent so that the silicone content is less than 10% by weight, and the diluted solution is coated on the surface of a substrate by spraying or brush coating. A release film is formed in a short time by evaporating the solvent at room temperature or by heating at a temperature not exceeding 150° C.

Since the thus obtained film does not migrate onto an article coming in contact therewith, the problem of repelling paint does not occur. Furthermore, the film has excellent durability and adhesion to the substrate, and can withstand repeated releasing. Moreover, even if the release property is reduced, the property can easily be restored by washing the treated surface and conducting the coating operation again. Furthermore, the compositions do not discolor when left standing and will impart good corrosion resistance and water-repellancy to the coated surfaces. For example, corrosion by rain water can be effectively prevented by utilizing a film of the present invention which is formed at room temperature. The method of the present invention also can be applied even to a sliding door formed of a wood material. Moreover, the method of the present invention is very effective for ensuring the smooth movement of a fastener. According to the present invention, a film can easily be formed on an article having a complicated configuration, such as a fastener, and this film cannot be removed by washing or the like.

The method of the present invention can be utilized in the processes for molding rubber and plastics, for manufacture of release papers, and in the casting industry. Additionally, the lubricating compositions can be useful for metals, plastics and woods. Furthermore, the method of the present invention is effective for preventing a sash or a weather strip of an automobile from being frozen and made immobile. Moreover, the method of the present invention is particularly advantageous for applying a release film on a wood or like substrate at room temperature.

DESCRIPTION OF THE PREFERRED EMBODIMENTS

In order for those skilled in the art to better practice the present invention, the following examples are given for purposes of illustration and are not intended to limit the present invention in any manner. Unless otherwise specified, all parts are by weight.

COMPOSITION A

A colorless transparent solution (composition A) was obtained by reacting at 80° C. for 8 hours a mixture comprising 0.5 part of the reaction product obtained by reacting equimolar amounts of gamma-aminopropyl-triethoxysilane and gamma-glycidoxypropyltrimethoxysilane at 80° to 100° for 3 hours, 30 parts of a polydimethylsiloxane having both ends blocked by a silanol group and having a viscosity of 20,000 centistokes as measured at 25° C., 10 parts of a polydimethylsiloxane having one end blocked by a silanol group and the other end blocked by a trimethylsilyl group and having a viscosity of 1,500 centistokes as measured at 25° C. and 60 parts of toluene.

COMPOSITION B

A colorless transparent solution (composition B) was obtained by reacting at 80° C. for 8 hours a mixture comprising 0.5 part of the reaction product obtained by reacting equimolar amounts of gamma-aminopropyl-triethoxysilane and gamma-glycidoxypropyltrimethoxysilane at 80° to 100° C. for 3 hours, 40 parts of a polydimethylsiloxane having both ends blocked by a silanol group and a viscosity of 50,000 centistokes as measured at 25° C. and 60 parts of toluene.

COMPOSITION C

A colorless transparent solution (composition C) was obtained by reacting at 90° C. for 12 hours a mixture comprising 2.5 parts of the reaction product obtained by reacting equimolar amounts of gamma-[N-(beta-aminoethyl)amino]-propyltrimethoxysilane and beta-(3,4-epoxycyclohexyl)ethylmethyldiethoxysilane at 80° to 100° C., 40 parts of a polydimethylsiloxane having both ends blocked by a silanol group and having a viscosity of 70,000 centistokes as measured at 25° C., 50 parts of toluene and 10 parts of isopropyl alcohol.

COMPOSITION D

A colorless transparent solution (composition D) was obtained by reacting at 90° C. for 12 hours a mixture comprising 2.5 parts of a reaction product obtained by reacting equimolar amounts of gamma-[N-(beta-aminoethyl)amino]-propyltrimethoxysilane and beta-(3,4-epoxycyclohexyl)-ethylmethyldiethoxysilane at 80° to 100° C., 30 parts of a polydimethysiloxane having both ends blocked by silanol groups and having a viscosity of 70,000 centistokes as measured at 25° C., 7.5 parts of a polydimethylsiloxane having one end blocked by a silanol group and the other end blocked by a trimethylsilyl group and having a viscosity of 500 centistokes as measured at 25° C., 50 parts of toluene and 10 parts of isopropyl alcohol.

EXAMPLE 1

The compositions A, B, and C were respectively diluted with toluene so that the silicone content was 10% by weight. Then, the diluted solutions were respectively coated on surface-washed aluminum molds and allowed to stand still at room temperature for 12 hours to form films.

Mixed materials for rigid urethane foam were cast in these molds and foaming was carried out. Urethane foams could easily be removed from the molds.

Skin roughening was not found on the surface of any of the urethane foams, and when an acrylic paint was coated on the surfaces of the urethane foams, repellancy was not experienced.

For comparison, a conventional release agent comprising a silicone fluid and silica was uniformly coated on the same mold as used above and a urethane foam was prepared in the same manner as described above. Skin roughening was found on the surface of the prepared urethane foam, and a paint could not be coated uniformly on the surface of the urethane foam because of repellancy.

EXAMPLE 2

The compositions A, B, and C were respectively diluted with toluene so that the silicone content was 3% by weight, and the diluted solutions were respectively spray-coated on the surfaces of SBR sponges so that the surfaces became wet. The solvent was evaporated by placing the coated sponges for 10 minutes in a hot air furnace maintained at 100° C. and the sponges were allowed to stand still at room temperature to form coating films.

The rubber sponges were dipped in water and kept in a freezing chamber of a refrigerator for 12 hours. Each rubber sponge could easily be taken out and did not stick to ice in the freezing chamber.

When a rubber sponge which was not treated with the release agent was similarly tested, the rubber sponge was fixed by ice between the rubber sponge and the bottom face of the freezing chamber, and therefore, the sponge could not be taken out.

EXAMPLE 3

The compositions A, B, and C were respectively diluted to a silicone concentration of 5%, brush-coated on parts of a surface-finished cedar pillar, and allowed to stand at room temperature for 12 hours to form coating films. When an acrylic emulsion paint for construction was coated on the pillar by using a roller brush, the paint could easily be wiped away by a cloth from the silicone-coated parts.

EXAMPLE 4

The compositions A, B, and D were respectively diluted with toluene so that the silicone content was 5% by weight. Then, the diluted solutions were separately coated on polished, degreased and washed stainless steel plates having a width of 3 cm and were allowed to stand still at room temperature for 12 hours, to evaporate the solvent and form lubricating films.

A polypropylene plate having a weight of 400 kg was placed on the coated stainless plate, and the polypropylene plate was pulled in the horizontal direction relative to the stainless steel plate. The force required for moving the polypropylene plate was measured and the results are shown in Table 1.

For comparison, a stainless steel plate which was not treated with a silicone composition was similarly tested, and the results are also shown in Table 1.

TABLE 1

| Composition Used | Force (g) Necessary for Movement At Initiation | |
|---|---|---|
| | Of Movement | During Movement |
| A | 32 | 26 |
| B | 47 | 39 |
| D | 33 | 28 |
| Untreated | 70 | 45 |

EXAMPLE 5

Fasteners having a zipper portion formed of aluminum were dipped for 5 minutes in the diluted solution of the compositions A, B, and D in which silicone contents were, respectively, 3% and were allowed to stand at room temperature for 12 hours to form lubricating films.

Forces necessary for opening and closing these fasteners were in the range of from 70 to 100 g.

When these fasteners were dipped for 10 minutes in perchloroethylene (80° C.) for dry cleaning, perchloroethylene was evaporated and forces necessary for opening and closing the fasteners were measured, it was found that these forces were in the range of from 80 to 120 g.

For comparison, the force necessary for opening and closing an untreated fastener was measured and it was found that the force was 150 to 200 g.

EXAMPLE 6

Fasteners having a zipper portion formed of aluminum were opened and closed 500 times to remove a surface aluminum oxide layer, and silicone films were formed on these fasteners in the same manner as described in Example 5.

These fasteners were dipped for 10 days in a 5% aqueous solution of sodium chloride at the temperature of 30° C. and forces necessary for opening and closing the fasteners were measured. It was found that the forces were in the range of 70 to 100 g. The cloth portions of the fasteners had a water-repelling property owing to the silicone film and remained dry.

For comparison, a fastener from which a surface aluminum oxide layer had been removed was similarly tested without formation of a silicone film. The aluminum zipper was corroded and blistering was observed. A force of 150 to 560 g was necessary for opening and closing the fastener. The cloth portion of the fastener absorbed water and became wet.

What is claimed is:

1. A method of imparting a release or lubricating property to a surface of a substrate, which comprises the steps of coating on the surface of the substrate a composition comprising a reaction product of (1) 80 to 99.9% by weight of a polydiorganosiloxane having a viscosity of 20 to 1,000,000 centistokes as measured at 25° C. and containing therein at least one silanol group per molecule with (2) 0.1 to 20% by weight of a reaction product of (A) an amino group-containing silane represented by the general formula:

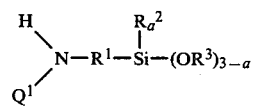

wherein $Q^1$ represents a monovalent group selected from the group consisting of hydrogen atom, $-CH_3$, $-CH_2CH_2,NH_2$ and $-CH_2CH_2NHCH_2CH_2NH_2$, $R^1$ represents a divalent hydrocarbon group having 1 to 4 carbon atoms, $R^2$ and $R^3$ stand for a monovalent hydrocarbon group having 1 to 4 carbon atoms, and a is 0 or 1, with (B) an epoxy group-containing silane represented by the following general formula:

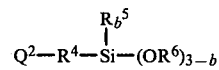

wherein $Q^2$ represents an epoxy group-containing group selected from the group consisting of glycidoxyl and epoxycyclohexyl groups, $R^4$ represents a divalent hydrocarbon group having 2 to 4 carbon atoms, $R^5$ and $R^6$ stand for a monovalent hydrocarbon group having 1 to 4 carbon atoms, and b is 0 or 1 wherein said reaction product is diluted with inert solvent to provide a silicone content of less than 10% by weight, coating a film on the surface of the substrate; and curing said film thereby imparting a release or lubricating property to the surface of the substrate.

2. A method as in claim 1 wherein the substrate is a sill for a sliding door.

3. A method as in claim 1 wherein the surface to be coated is a non-smooth surface.

4. A method as in claim 3 wherein said surface of a substrate is a surface of a fastener.

5. A method as in claim 1 wherein said polydiorganosiloxane of component 1 is comprised of 10 to 80% by weight of a polydiorganosiloxane having one end blocked by a silanol group.

6. A silicone releasing or lubricating composition comprising a reaction product of (1) 80 to 99.9% by weight of a polydiorganosiloxane having a viscosity of 20 to 1,000,000 centistokes as measured at 25° C. and containing at least one silanol group per molecule with (2) 0.1 to 20% by weight of a reaction product of (A) an amino group-containing silane represented by the following general formula:

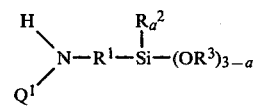

wherein $Q^1$ represents a monovalent group selected from the group consisting of hydrogen atom, $-CH_3$, $-CH_2CH_2NH_2$ and $-CH_2CH_2NHCH_2CH_2NH_2$, $R^1$ represents a divalent hydrocarbon group having 1 to 4 carbon atoms, $R^2$ and $R^3$ represent a monovalent hydrocarbon group having 1 to 4 carbon atoms, and a is 0 or 1, with (B) an epoxy group-containing silane represented by the following general formula:

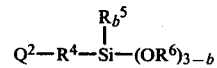

wherein $Q^2$ represents an epoxy group-containing group selected from the group consisting of glycidoxyl and epoxycyclohexyl groups, $R^4$ represents a divalent hydrocarbon group having 2 to 4 carbon atoms, $R^5$ and $R^6$ represents a monovalent hydrocarbon group having 1 to 4 carbon atoms, and b is 0 or 1.

7. A composition as in claim 6, wherein 10 to 80% by weight of the polydiorganosiloxane (1) is a polydiorganosiloxane having one end blocked by a silanol group.

* * * * *